(12) United States Patent
Roseway et al.

(10) Patent No.: US 10,725,002 B2
(45) Date of Patent: Jul. 28, 2020

(54) CHEMICAL SENSORS FOR DETECTION AND DISPLAY OF ENVIRONMENTAL HAZARDS

(71) Applicant: Microsoft Technology Licensing, LLC, Redmond, WA (US)

(72) Inventors: Asta Jane Roseway, Cyde Hill, WA (US); Bichlien Hoang Nguyen, Seattle, WA (US); Hsin-Liu Kao, Cambridge, MA (US); Michael David Dickey, Raleigh, NC (US); Vikram Reddy Dendi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 207 days.

(21) Appl. No.: 15/723,094

(22) Filed: Oct. 2, 2017

(65) Prior Publication Data

US 2018/0120274 A1 May 3, 2018

Related U.S. Application Data

(60) Provisional application No. 62/417,088, filed on Nov. 3, 2016.

(51) Int. Cl.
*G01N 31/22* (2006.01)
*G08B 21/12* (2006.01)
*G01J 1/50* (2006.01)
*G01J 1/02* (2006.01)
*G01J 1/42* (2006.01)

(52) U.S. Cl.
CPC .......... *G01N 31/224* (2013.01); *G01J 1/0219* (2013.01); *G01J 1/429* (2013.01); *G01J 1/50* (2013.01); *G08B 21/12* (2013.01); *G01J 2001/0257* (2013.01); *G01N 31/22* (2013.01)

(58) Field of Classification Search
CPC .................................................... G01N 31/224
USPC ......................................................... 116/206
See application file for complete search history.

(56) References Cited

U.S. PATENT DOCUMENTS

| | | | |
|---|---|---|---|
| 4,012,232 A | 3/1977 | Uhlmann et al. | |
| 5,896,089 A | 4/1999 | Bowles | |
| 5,958,383 A | 9/1999 | McEleney et al. | |
| 5,986,273 A | 11/1999 | Tripp et al. | |
| 6,406,914 B1 | 6/2002 | Kaburaki et al. | |
| 6,818,904 B1 * | 11/2004 | Ferren ....................... | G01J 1/50 250/461.1 |
| D528,933 S | 9/2006 | Hunter et al. | |

(Continued)

OTHER PUBLICATIONS

"Detecting ultraviolet radiation", https://www.youtube.com/watch?v=g4Bj8-5IuJE, Retrieved on: Oct. 13, 2016, NA pages.

(Continued)

*Primary Examiner* — Walter L Lindsay, Jr.
*Assistant Examiner* — Philipmarcus T Fadul

(57) ABSTRACT

Described herein are systems and methods for coupling environmental hazard detection and actuation of a wearable chemical sensor at a molecular level. The chemical sensor may be a wearable chemical sensor implemented as a powder, cream, lacquer or other wearable construct. The wearable chemical sensor may detect exposure to various environmental hazards and provide an analog means (e.g., a range of color changes) of indicating the level of environmental hazard exposure.

20 Claims, 13 Drawing Sheets

(56) References Cited

U.S. PATENT DOCUMENTS

| | | | |
|---|---|---|---|
| 8,049,186 | B2 | 11/2011 | Studer et al. |
| 8,084,003 | B2 | 12/2011 | Miwa et al. |
| 2002/0022008 | A1 | 2/2002 | Forest et al. |
| 2003/0030040 | A1 | 2/2003 | Luthern et al. |
| 2004/0126340 | A1 | 7/2004 | Jo |
| 2005/0118123 | A1 | 6/2005 | Vaidya |
| 2006/0067896 | A1 | 3/2006 | Schaffer |
| 2008/0280077 | A1 | 11/2008 | Huang |
| 2008/0296513 | A1* | 12/2008 | Ribi .................... G01J 1/50 250/474.1 |
| 2015/0083934 | A1 | 3/2015 | Richter |
| 2015/0241273 | A1 | 8/2015 | Aslam et al. |
| 2016/0089316 | A1 | 3/2016 | Sanders |
| 2016/0312262 | A1* | 10/2016 | Lee ..................... C12Q 1/6825 |
| 2017/0024530 | A1* | 1/2017 | Flitsch ................. H04W 4/023 |

OTHER PUBLICATIONS

"Aerochromics", http://aerochromics.com/, Retrieved on: Oct. 19, 2016, 5 pages.

Mills, et al., "Flagging up sunburn: a printable, multicomponent, UV-indicator that warns of the approach of erythema", In Journal of Chemical Communications, Issue 11, Feb. 10, 2009, 1 page, Abstract Only.

"Apple Watch", http://www.apple.com/watch/, Retrieved on: Oct. 19, 2016, 4 pages.

Su, et al., "NailDisplay: Bringing an Always-Available Visual Display to Fingertips", In Proceedings of SIGCHI Conference on Human Factors in Computing Systems, Apr. 27, 2013, pp. 1461-1464.

Young, Charlotte, "Solar ultraviolet radiation and skin cancer", In Journal of Occupation Medicine, vol. 59, Issue 2, Mar. 2009, pp. 82-88.

Harrison, et al., "Skinput: Appropriating the Body as an Input Surface", In Proceedings of SIGCHI Conference on Human Factors in Computing Systems, Apr. 10, 2010, pp. 453-462.

Harrison, et al., "OmniTouch: Wearable Multitouch Interaction Everywhere", In Proceedings of 24th Annual ACM Symposium on User Interface Software and Technology, Oct. 16, 2011, pp. 441-450.

"Climate Dress", http://www.diffus.dk/climate-dress/, Retrieved on: Oct. 19, 2016, 2 pages.

"CO Knowledge Center", http://www.detectcarbonmonoxide.com/co-health-risks/, Retrieved on: Oct. 19, 2016, 5 pages.

"Cute Circuit", https://cutecircuit.com/, Retrieved on: Oct. 19, 2016, 3 pages.

Post, et al., "E-broidery: design and fabrication of textile-based computing", In IBM Systems Journal, vol. 39, Issue 3-4, Jul. 2000, 840-860 pages.

Laput, et al., "Skin Buttons: Cheap, Small, Low-Power and Clickable Fixed-Icon Laser Projections", In Proceedings of 27th Annual ACM Symposium on User Interface Software and Technology, Oct. 5, 2014, pp. 389-394.

"Glass", https://www.google.com/glass/start/, Retrieved on: Oct. 19, 2016, 1 pages.

Wang, et al., "xPrint: A Modularized Liquid Printer for Smart Materials Deposition", In Proceedings of CHI Conference on Human Factors in Computing Systems, May 7, 2016, pp. 5743-5752.

Kao, et al., "DuoSkin: Rapidly Prototyping On-Skin User Interfaces Using Skin-Friendly Materials", In Proceedings of ACM International Symposium on Wearable Computers, Sep. 12, 2016, 8 pages.

Kao, et al., "ChromoSkin: Towards Interactive Cosmetics Using Thermochromic Pigments", In Proceedings of CHI Conference Extended Abstracts on Human Factors in Computing Systems, May 7, 2016, pp. 3703-3706.

Isaksen, Ivar S.A., "Tropospheric Ozone: Regional and Global Scale Interactions", In Publication of Springer Science & Business Media, Dec. 2012, 1 page, Abstract Only.

Raub, et al., "Carbon monoxide poisoning—a public health perspective", In Journal of Toxicology, vol. 145, Issue 1, Apr. 7, 2000, pp. 1-14.

Kim, et al., "A wearable fingernail chemical sensing platform: pH sensing at your fingertips", In Journal of Talanta, vol. 150, Apr. 2016, 1 page, Abstract Only.

Burke, et al., "Participatory Sensing", In Publication of Center for Embedded Network Sensing, University of California, May 5, 2006, 6 pages.

Berzowska, Joanna, "Very Slowly Animating Textiles: Shimmering Flower", In Proceedings of 31st international conference on computer graphics and interactive techniques, Aug. 8, 2004, 1 page.

Charmaz, Kathy, "Constructing Grounded Theory: A Practical Guide Through Qualitative Analysis", In SAGE Publications, Jan. 27, 2006, 224 pages.

"L'Oreal Debuts First-Ever Stretchable Electronic UV Monitor at the 2016 Consumer Electronics Show", http://www.loreal.com/media/press-releases/2016/jan/loreal-debuts-first-ever-stretchable-electronic-uv-monitor, Published on: Jan. 6, 2016, 4 pages.

Devendorf, et al., ""e;I don't want to wear a Screen"e;: Probing Perceptions of and Possibilities for Dynamic Displays on Clothing", In Proceedings of the CHI Conference on Human Factors in Computing Systems, May 7, 2016, pp. 6028-6039.

Yao, et al., "bioLogic: Natto Cells as Nanoactuators for Shape Changing Interfaces", In Proceedings of the 33rd Annual ACM Conference on Human Factors in Computing Systems, Apr. 18, 2015, pp. 1-10.

Nilsson, et al., "Understanding the complexity of designing dynamic textile patterns", In Proceedings of Ambience international conference, and exhibition, Nov. 28, 2011, 8 pages.

"Microsoft Hololens", https://www.microsoft.com/microsoft-hololens/en-us, Retrieved on: Oct. 19, 2016, 9 pages.

"Oculus", https://www.oculus.com/, Retrieved on: Oct. 19, 2016, 6 pages.

"Pebble Smart Watch", https://www.pebble.com/, Retrieved on: Oct. 19, 2016, 2 pages.

Peiris, et al., "dMarkers: Ubiquitous Dynamic Makers for Augmented Reality", In Proceedings of the 10th International Conference on Virtual Reality Continuum and Its Applications in Industry, Dec. 11, 2011, pp. 217-224.

Tian, et al., "MyPart: Personal, Portable, Accurate, Airborne Particle Counting", In Proceedings of the CHI Conference on Human Factors in Computing Systems, May 7, 2016, pp. 1338-1348.

Olberding, et al., "PrintScreen: Fabricating Highly Customizable Thin-Film Touch-Displays", In Proceedings of the 27th annual ACM symposium on User interface software and technology, Oct. 5, 2014, pp. 281-290.

Kuznetsov, et al., "Red Balloon, Green Balloon, Sensors in the Sky", In Proceedings of the 13th international conference on Ubiquitous computing, Sep. 17, 2011, pp. 237-246.

Kim, et al., "inAir: Measuring and Visualizing Indoor Air Quality", In Proceedings of the 11th international conference on Ubiquitous computing, Sep. 30, 2009, pp. 81-84.

Kim, et al., "WearAir: Expressive T-shirts for Air Quality Sensing", In Proceedings of the fourth international conference on Tangible, embedded, and embodied interaction, Jan. 25, 2010, pp. 295-296.

"The Unseen", http://seetheunseen.co.uk/, Retrieved on: Oct. 19, 2016, 1 pages.

Yokota, et al., "Ultraflexible Organic Photonic Skin", In Journal of Science Advances, vol. 2, No. 4, Apr. 15, 2016, pp. 1-8.

Kan, et al., "Social Textiles: Social Affordances and Icebreaking Interactions through Wearable Social Messaging", In Proceedings of the Ninth International Conference on Tangible, Embedded, and Embodied Interaction, Jan. 15, 2015, pp. 619-624.

Burrows, et al., "Tracer Sensitive Tapes", in Technical Report, Nov. 1971, 35 pages.

"Sporty's Pilot Shop", http://www.sportys.com/pilotshop/carbon-monoxide-detector.html, Published on: 2000, 26 pages.

"Carbon Monoxide Detectors", https://www.amazon.com/Carbon-Monoxide-Detectors/b?ie=UTF8&node=495272, Retrieved on: Oct. 19, 2016, 5 pages.

(56) References Cited

OTHER PUBLICATIONS

"The Violet App", http://www.liveultrahealthy.com/, Retrieved on: Oct. 19, 2016, 9 pages.

* cited by examiner

CHEMICAL SENSORS FOR DETECTION AND DISPLAY OF ENVIRONMENTAL HAZARDS

CROSS-REFERENCE TO RELATED APPLICATION(S)

This application claims priority to U.S. Provisional Application No. 62/417,088 entitled "Chemical Sensors For Detection And Display Of Environmental Hazards," filed on Nov. 3, 2016, of which the entire disclosure is hereby incorporated by reference in its entirety.

BACKGROUND

There are various technologies designed to detect environmental hazards. However, the direct integration of those technologies for personal use is extremely limited for various reasons. For example, the detection and communication of exposure to environmental hazards to individuals typically involves the use of multiple devices as part of electronic computing systems, which can be cumbersome to adapt for daily use because of the necessity of carrying one or more devices associated with the electronic computing systems in order to receive exposure feedback. Individuals may find doing so both cumbersome and unattractive depending on the size and rigidity of the devices involved. Further, because electronic devices inherently require power in order to remain active, individuals may find that the annoyance of charging the batteries associated with such devices is an annoyance that does not warrant their use.

It is with respect to these and other general considerations that embodiments have been described. Also, although relatively specific problems have been discussed, it should be understood that the embodiments should not be limited to solving the specific problems identified in the background.

SUMMARY

Embodiments disclosed herein provide a wearable chemical sensor that is implemented as a powder, a cream, a patch, a lacquer, or other wearable construct. The wearable chemical sensor detects exposure to various pollutants or environmental hazards and provides an analog output comprising a range of color changes to indicate the exposure level to the environmental hazard or pollutant. The range of color changes are provided through one or more chemical reactions or responses related to that exposure.

In a first aspect, a wearable chemical sensor includes a first layer for receiving a pollutant and a second layer underlying the first layer for producing a range of color changes over time through one or more chemical reactions that is based on a length of exposure to the pollutant or a concentration of the pollutant. The color changes in the range of color changes represent different exposure levels to the pollutant. In one embodiment, the chemical reaction is an isomerization reaction that includes a re-arrangement of atoms. In other embodiment, the chemical reaction is a conversion reaction that converts one or more chemicals or substances into one or more different chemicals or substances. In one embodiment, the wearable chemical sensor is a wearable powder chemical sensor.

In another aspect, a method includes receiving data from one or more electronic sensors in or connected to a client-computing device and analyzing the received data to determine a recommendation for a wearable chemical sensor. The wearable chemical sensor is configured to produce a range of color changes over time through one or more chemical reactions (conversion or a re-arrangement of atoms) that is based on a length of exposure to the pollutant or a concentration of the pollutant. The analysis includes the use of a machine learning process that determines the recommendation based on one or more skin qualities associated with a user. The skin qualities include, but are not limited to, skin elasticity, ultraviolet radiation damage, skin color, and/or wrinkles. Once the recommendation is determined, a presentation of the recommendation is caused to be presented on a client-computing device.

In yet another aspect, a method of operating a wearable chemical sensor includes detecting a pollutant and producing a range of color changes over time through one or more chemical reactions (e.g., a conversion reaction or an isomerization reaction) that is based on a length of exposure to the pollutant or a concentration of the pollutant, the range of color changes representing exposure levels to the pollutant. One or more chemicals are released when an exposure level reaches a given exposure level. For example, the one or more chemicals can produce a tactile stimulation and/or provide a protectant. In one embodiment, the given exposure level is a level that approaches or is a harmful exposure level.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures. The elements of the drawings are not necessarily to scale relative to each other. Identical reference numerals have been used, where possible, to designate identical features that are common to the figures.

Figure 1:
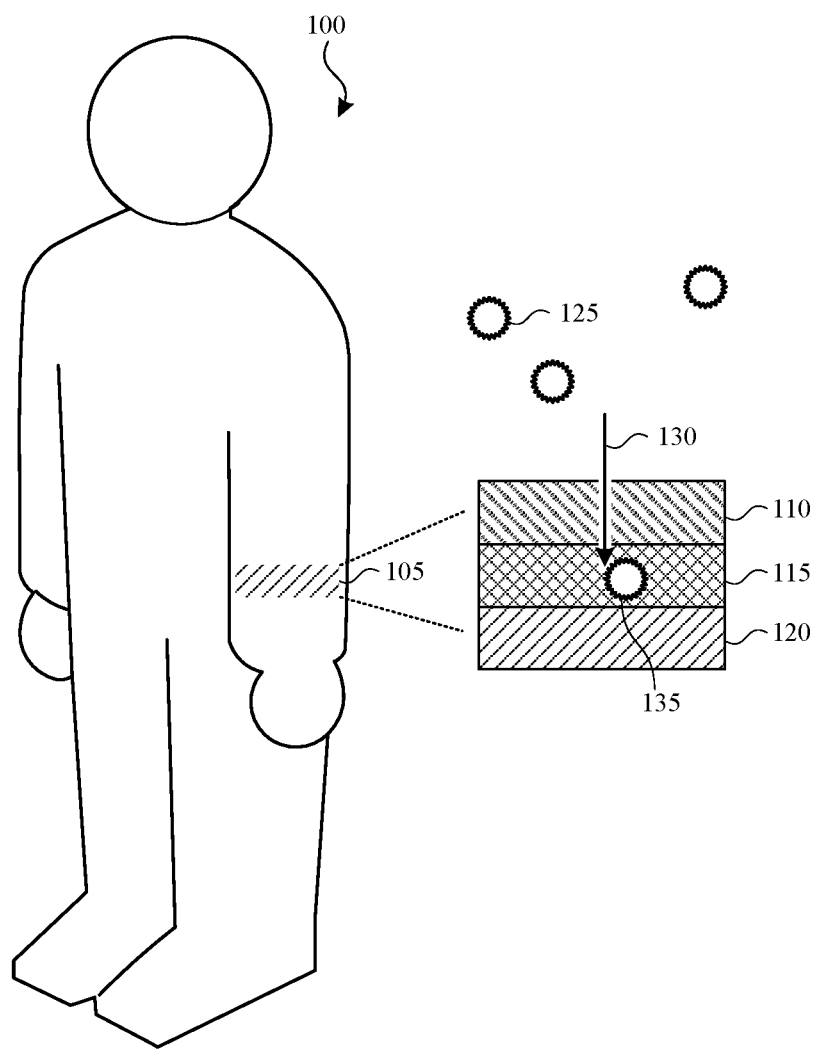
FIG. 1 illustrates an example wearable chemical sensor affixed on a user.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Exposure to various environmental hazards is becoming increasingly important to individuals as the link of such exposure to negative health effects has been well documented and conveyed to the public. Exposure to such hazards often goes undetected, which can lead to minor health effects such as nausea or major health effects such as cancer and even death. For example, exposure to carbon monoxide is the cause of more than one-half of unpredicted fatal poisonings, exposure to ultraviolet radiation is linked to increased rates of skin cancer, and exposure to ozone has been linked to the exacerbation of lung disease and is especially harmful for individuals with chronic lung disease and those that suffer from asthma.

While there are technologies to detect environmental hazards, those technologies typically require power consumption and electronics (e.g., environmental hazard detection electronics which may be paired with other electronic devices such as mobile phones), and entire systems are cumbersome in use (e.g., they cannot be worn seamlessly on the body). For some individuals, applying powders and creams to various parts of their bodies is a daily habitual practice. Whether decorative or medicinal, the use of such compositions is meant to blend seamlessly with the body during application and be easily removable when desired.

Aspects of the current disclosure provide systems, methods and compositions which couple environmental hazard detection and actuation at the molecular level in the form of wearable chemical sensors such as powders, creams, varnishes, and other compounds that may be applied and integrated on a human body. According to examples, wearable chemical sensors detect and provide an analog means of indicating levels of exposure to various environmental hazards, including carbon monoxide, ultraviolet radiation, and ozone. The indication of such exposure may be provided by a range of color changes of the chemical sensor through one or more chemical reactions related to that exposure. The indication of exposure may also be provided by a molecular change in the chemical sensor that produces a noticeable tactile response (e.g., tingling sensation, warming sensation, cooling sensation, etc.).

According to examples, wearable chemical sensors that provide indication of environmental hazard exposure through multiple color changes may be adapted and highly personalized for various geographies and skin colors. One or more pigments can be added to the chemical sensor (e.g., the chemical compound(s)) to produce or tune the wearable chemical sensors to have different fashionable, decorative, or given color characteristics. Various pigment and reactant combinations may be implemented in such wearable chemical sensors in order to create compounds that are aesthetically pleasing on a variety of skin tones, both when no environmental exposure has occurred (i.e., no chemical reaction and/or molecular change has occurred) and when one or more color changes of the chemical sensor has occurred (i.e., a chemical reaction and/or molecular change leading to color change has occurred). In addition to providing various aesthetically pleasing color tones, wearable chemical sensors may react at various exposure levels such that their application is tailored to various geographies and skin tones. For example, in the case of ultraviolet radiation exposure, a compound in a wearable chemical sensor may be tailored to darker skinned individuals such that a color changing reaction (ultraviolet radiation protectant reaction) occurs at exposure levels that are higher than for a wearable chemical sensors tailored for lighter skinned individuals who may burn easier.

Examples provide natural chemical indicators that detect environmental hazard input and generate analog output through color change and/or noticeable tactile responses, without the use of electronic components. This enables form factors which can be intimately connected to the human body, such as a fingernail-based pH Sensor. According to some aspects chemicals may be applied to the body in a manner resembling makeup or other topical medication such that their appearance upon application resembles natural body coloration. Further, upon detecting exposure to an environmental hazard, the chemicals may react and a resulting color change and/or noticeable tactile response may result, providing a means of communicating such exposure to individuals.

According other examples, in addition to providing a visible or tactile indication of environmental hazard exposure, wearable chemical sensors may be provided for activating one or more protectants when levels of exposure to an environmental hazard reach a threshold level. According to one example, a wearable chemical sensor may react when exposed to an environmental hazard and at a threshold level of exposure a chemical reaction and/or molecular change associated with a wearable chemical sensor may cause a protectant against the environmental hazard to be released. According to a specific example, upon reaching a threshold level of ultraviolet radiation exposure, a wearable chemical sensor may cause the SPF level of an applied ultraviolet radiation protectant (e.g., sunscreen) to increase. According to another example, burst nano particles may be triggered by a chemical reaction and/or molecular change associated with a wearable chemical sensor being exposed to a threshold level of an environmental hazard.

Systems and methods are provided herein for providing individuals with personalized wearable chemical sensor recommendations. For example, one or more computing devices may receive user information such as location data (e.g., GPS coordinates of a mobile device associated with the user), images of a user (e.g., from a camera application), application account information for a user (e.g., email, calendar, contacts, web browser history, etc.) and one or more recommendations may be provided to a user based on analyzing one or more pieces of data extracted from the user information. For example, facial recognition and analysis software may make a determination regarding the skin tone of a user and recommendations for specific wearable chemical sensors tailored to persons in a range of that skin tone may be provided to the user. Additionally, machine learning algorithms or techniques (e.g., a neural network that learns from and produces predictions based on data) may be implemented to analyze user skin changes as they relate to one or more skin qualities such as elasticity, ultraviolet radiation damage, wrinkles, etc. The machine learning may be implemented over time to provide relevant personalized wearable chemical sensor recommendations based on one or more skin qualities and their development over time. According to another example a determination may be made based on extracted calendar information (e.g., through one or more language model and/or machine learning) that a user is planning a trip to a tropical location and one or more wearable chemical sensors tailored to that environment may be provided to the user.

According to other examples, global data (e.g., data from the World Wide Web) which has been determined to be relevant to a user may also be analyzed and personalized recommendations may be further tailored to a user based on that analysis. For example, a determination may be made based on extracted user information that a user is planning a trip to Beijing. Given this information one or more web searches may be made related to Beijing, and one or more conditions as they relate to Beijing, such as weather information, climate information, pollution information, etc. Based on that information various analytics software engines may make determinations such as what the weather is likely to be during the user's planned travel, what the pollution is likely to be during the user's planned travel, etc. From those determinations recommendations may be further tailored for the user regarding a type of wearable chemical sensor that is likely to be useful or desirable for the user to apply during their planned trip.

According to other aspects, an application may be provided for processing an image of an applied wearable chemical sensor and providing an indication based on that processing of what type of exposure has occurred and the extent of that exposure. For example, a user that has applied an ultraviolet light chemical sensor to their face may utilize a camera (e.g., a camera on their mobile phone) and take an image of their face (e.g., a selfie). The user may then upload the image of their face to the application, which may analyze one or more patterns and/or colors in the image and make a determination as to the type of wearable chemical sensor that has been applied to the user, the type of exposure that has occurred (e.g., ultraviolet radiation) and the extent of that exposure (e.g., the amount of ultraviolet radiation that the chemical has absorbed).

FIG. 1 illustrates an example wearable chemical sensor affixed on a user. In the representative embodiment, the user 100 has attached the wearable chemical sensor 105 to his or her arm, although this is not required. One or more wearable chemical sensors may each be affixed on any part of the body, such as a leg, the face, the neck, the chest, an arm, the hand, a finger, and/or a fingernail. The wearable chemical sensor 105 couples detection and color actuation at the molecular level. In one embodiment, this may be driven by a two-component system: an active component that senses input (e.g., environmental hazards and pollutants) and an output component that activates a corresponding output color change. In some cases, the two components can be coupled in a single chemical reaction. The wearable chemical sensor 105 can be configured as a powder, a patch, a mixed cream or lotion, or in any other suitable form of a wearable chemical sensor.

In the illustrated embodiment, the wearable chemical sensor 105 includes a first layer 110, a second layer 115 that functions as an active component, and a third layer 120 that functions as an output component. Pollutants or environmental hazards 125 (e.g., ultraviolet (UV) light, ozone, carbon monoxide (CO)) are received by and pass through the first layer 110 (represented by arrow 130) to be detected by the second layer 115 (e.g., pollutant 135). The term pollutant is used in the description and is intended to be construed broadly to include pollutants (e.g., CO and ozone) and other environmental hazards, such as ultraviolet radiation.

In one embodiment, the second layer 115 reacts to the pollutant to produce a chemical response (e.g., a conversion reaction). The third layer 120 is positioned on or over the user's skin and includes a chemical sensing element that detects the chemical response produced by the second layer 115 and generates a color change by one or more chemical reactions. The color change varies based on the concentration of the pollutant and/or the length of exposure (e.g., amount of time) of the wearable chemical sensor 105 to the pollutant. The resulting color changes over time provide an analog means (e.g., a range of colors) of indicating levels of exposure to the pollutant. The color changes can be visually detectable by the user to alert the user to his or her exposure level over time.

In another embodiment, the pollutant (e.g., ultraviolet radiation) passes through the first and the second layers 110, 115 to react with the third layer 120 and produce a conversion reaction or an isomerization reaction in the third layer 120. The isomerization reaction transforms the first molecules in the third layer 120 into second molecules that have the same atoms as the atoms in the first molecule but the atoms in the second molecule have a different arrangement. The isomerization reaction causes the color to change over time. The color change varies based on the concentration of the pollutant and/or the length of exposure of the wearable chemical sensor 105 to the pollutant. Again, the resulting color changes over time provide an analog means (e.g., a range of colors) of indicating levels of exposure to the pollutant. The color changes can be visually detectable by the user to alert the user to his or her exposure level over time.

In one embodiment, the first layer 110 can be a polymeric barrier such as an adhesive that protects the wearable chemical sensor 105 and the user's skin. The second layer 115 positioned between the first layer 110 and the third layer 120 may be a permeable layer that allows the pollutants 125 to pass through and be detected by the third layer 120. In one aspect, the first and the second layers 110, 115 may be transparent or translucent to allow the color changes to be visible through the first and the second layers 110, 115.

Although the wearable chemical sensor 105 is described as including a first layer 110 and a second layer 115 disposed over the third layer 120, other embodiments are not limited to this construction. In some aspects, a wearable chemical sensor can position or include one or more layers over the third layer 120.

Figure 2:
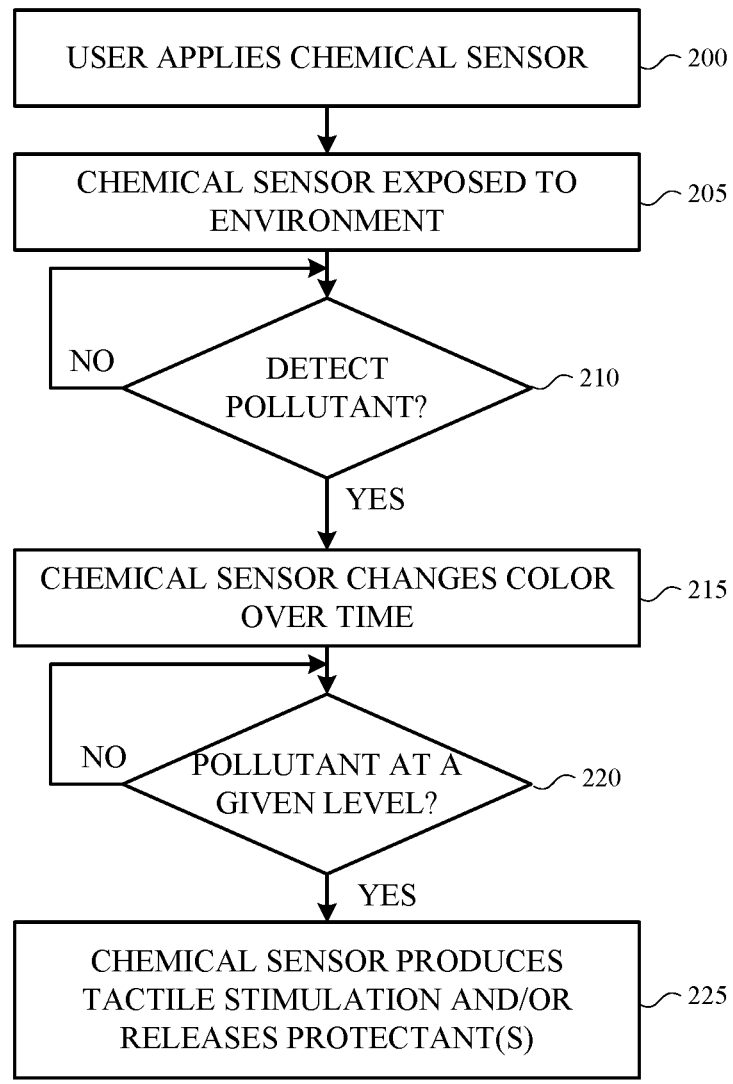
FIG. 2 is a flowchart depicting an example method of operating a wearable chemical sensor.

FIG. 2 is a flowchart depicting an example method of operating a wearable chemical sensor. Although FIG. 2 is described in conjunction with a single wearable chemical sensor that detects one type of a pollutant, a user can apply multiple wearable chemical sensors in other embodiments. In such embodiments, the wearable chemical sensors can detect the same type of pollutant or different types of pollutants. Alternatively, a wearable chemical sensor can detect multiple types of pollutants and indicate the exposure to the multiple pollutants through color changes.

Initially, as shown in block 200, a user applies a wearable chemical sensor to his or her skin. As previously discussed, the wearable chemical sensor can be a powder, a patch, a mixed cream or lotion, or any other suitable wearable chemical sensor. The wearable chemical sensor is then exposed to the environment (e.g., air) at block 205. A determination is make as to whether the chemical sensor detects a pollutant (block 210). If not, the wearable chemical sensor does not change color and the method waits at block 210 until the chemical sensor detects the pollutant. If the wearable chemical sensor detects the pollutant, the process passes to block 215 where the wearable chemical sensor changes color over time based on the length of exposure and/or the concentration of the pollutant. In some embodiments, the color changes over time transition from a first color to a second color. In other embodiments, a saturation or intensity of one color changes over time.

In some embodiments, a determination may be made as to whether the exposure level to the pollutant has reached a given level (block 220). If not, the method waits at block 220. If the exposure level has reached a given level at block 220, the process passes to block 225 where the wearable chemical sensor releases one or more chemicals to produce a tactile stimulation and/or release a protectant. For example, the given level of exposure may be approaching a harmful exposure level and the wearable chemical sensor may be configured to produce (via one or more other chemical reactions) a tingling sensation, a thermal sensation (e.g., heat), or a cooling sensation to alert the user to the hazardous exposure level. Additionally or alternatively, a protectant against the environmental hazard can be released. In a non-limiting example, upon reaching a threshold level of UV radiation exposure, a wearable chemical sensor may cause the SPF level of an applied ultraviolet radiation protectant (e.g., sunscreen) to increase.

In some embodiments, a wearable chemical sensor can be used to detect carbon monoxide (CO), ultraviolet (UV) radiation, or ozone ($O_3$). Wearable chemical sensors that detect each of these pollutants are now described in more detail.

Carbon Monoxide Chemical Sensor

CO is an odorless, colorless, and tasteless gas that can occur indoors due to leaky appliances fueled by natural gas, or outdoor vehicle exhausts and coal burning systems. When inhaled, CO displaces the oxygen in the blood stream, which disrupts normal inspiratory function. With CO, 50 parts per million (ppm) is the maximum permissible exposure level in some environments, such as workplaces. Exposure beyond 100 ppm can be life threatening after three hours.

In one embodiment, a wearable chemical sensor (e.g., a CO chemical sensor) takes advantage of the oxidation of CO to carbon dioxide ($CO_2$) by a palladium (II) complex. The $PdSO_4$ can be embedded in a material to produce a given color. For example, the $PdSO_4$ may be embedding in silica to generate a tan color (e.g., the embedded $PdSO_4$ can be in the third layer 120 of FIG. 1). The Pd (II) species oxidizes the CO to $CO_2$ and is reduced to a Pd(0) species, which is black. The chemical reaction of the CO chemical sensor resulting in color change is as follows.

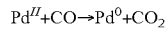

$$Pd^{II} + CO \rightarrow Pd^0 + CO_2 \qquad \text{Equation 1}$$

Figure 3:
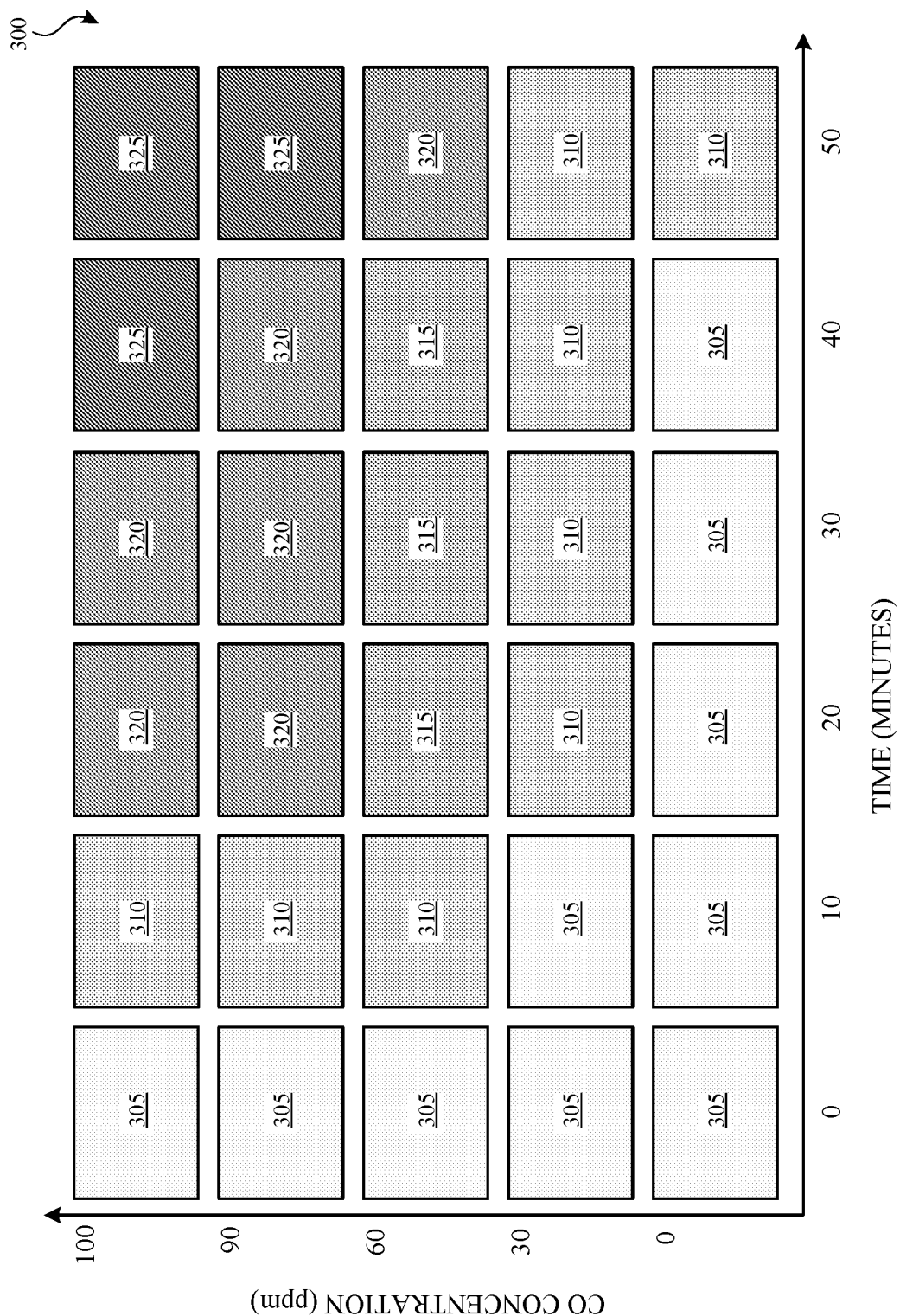
FIG. 3 is a table illustrating the color changing effects of exposing a carbon monoxide chemical sensor to various concentrations of carbon monoxide over time.

FIG. 3 is a table illustrating the color changing effects of exposing a CO chemical sensor to various concentrations of carbon monoxide over time. The table 300 represents color change as a function of both CO concentration and time. The illustrated embodiment has five different color changes 305, 310, 315, 320, and 325 that occur over zero to fifty minutes, but other embodiments can represent any number of color changes over any given amount of time. As shown in FIG. 3, at a safe threshold of 30 ppm, the CO chemical sensor had little color response (color 305 changes to color 310 over the 50 minutes). At 60 ppm, the response of the CO chemical sensor is more visible having four different color changes over time. For example, at or around ten minutes the color changes from color 305 to color 310 and around 20 minutes the color changes from color 310 to color 315. At or around fifty minutes, the color changes from color 315 to color 320.

At 90 ppm, the response of the CO chemical sensor has four different color changes over time. For example, at or around ten minutes the color changes from color 305 to color 310 and around 20 minutes the color changes from color 310 to color 320. At or around fifty minutes, the color changes from color 320 to color 325. At 100 ppm, the response of the CO chemical sensor also has four different color changes over time. For example, at or around ten minutes the color changes from color 305 to color 310 and around 20 minutes the color changes from color 310 to color 320. At or around forty minutes, the color changes from color 320 to color 325.

Ultraviolet Radiation Chemical Sensor

UV radiation is an invisible form of electromagnetic radiation that has a shorter wavelength and higher energy than visible light. UV radiation can break bonds between atoms in molecules. A person can experience a sunburn as a result of a mild exposure to UV radiation. With excessive exposure to UV radiation, DNA molecular structures may be altered. In some instances, UV radiation can ultimately result in skin cancer.

In one embodiment, a wearable chemical sensor (e.g., a UV chemical sensor) can include one or more photoacids and one or more pH-sensitive dyes. A photoacid absorbs UV radiation and generates an acid in proportion to the amount of radiation absorbed. The released acid reacts with the pH-sensitive dye(s) produces a gradual color change in the pH-sensitive dye(s). In such embodiments, one layer in the UV chemical sensor (e.g., third layer 120 in FIG. 1) includes the one or more pH-sensitive dyes and an overlying layer (e.g., second layer 115 in FIG. 1) includes the one or more photoacids.

The onset time prior to color change can be modulated by the addition of a base that acts as an acid buffer. The chemical reactions of the UV chemical sensor are as follows:

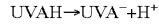

$$UVAH \rightarrow UVA^- + H^+ \qquad \text{Equation 2}$$

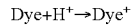

$$Dye + H^+ \rightarrow DyeH^+ \qquad \text{Equation 3}$$

The $DyeH^+$ produces a continuous color change over time.

In one embodiment, the UV chemical sensor employs diphenyliodonium chloride (DPIC) as the photoacid and thymol blue (TB) as the pH-sensitive dye. The rate at which the pH-sensitive dye changes color is dependent on the formulation. With a photoacid, the formulation can include a base that tempers or slows down the color change over time. For example, with a photoacid, sodium hydroxide (NaOH) dissolved in a mixture of water and ethanol can be used as the base. The resulting UV chemical sensor is a solution-based UV chemical sensor. To transform the solution into a powder, the solution is first dried as a thin layer on a glass surface pretreated with dilute aqueous NaOH and once dried, the solid is scraped off and crushed into a powder.

Other embodiments can use different chemicals in a UV chemical sensor. For example, the dyes from family of anthrocyanins can be used, such as Cyanidin (color changes from blue to red) or Peonidin (color changes from purple to pink). Alternatively, a Malachite green dye (color changes from yellow to green) or a Phenolphthalein dye (color changes from colorless to pink/red) may be used.

In some embodiments, photogenerated bases can be used instead of photoacids to produce color changes in the pH-sensitive dyes. With a photogenerated base, the formulation can include an acid as a base that slows down the color change over time. Again, the rate at which the pH-sensitive dye changes color is dependent on the formulation.

As described earlier, a wearable chemical sensor may include one or more protectant chemicals that can be released when the exposure level to a pollutant reaches a given level or amount. In one example, a photocleavable polymer may encapsulate a dye (as color indicator) and a skin protectant (e.g., sunblock). Polymeric microcapsules may contain groups that cleave upon exposure to UV radiation to release the chemicals inside. The photocleavable polymer can contain photocleavable moieties such as 2-nitrobenzyl groups, phenacyl groups, and others and combination of multiple groups. The photocleavable polymer may be incorporated into polymer backbone or can be groups off a backbone.

Additionally or alternatively, a wearable chemical sensor can include one or more chemicals that produce a tactile sensation. In one example, the photocleavable polymer can encapsulate a dye (as color indicator) and tactile stimulation chemicals. Any suitable tactile stimulation chemical may be used. For example, menthol or an essential oil such as peppermint oil may be used. In some aspects, the tactile stimulation chemicals may also result in an olfactory response (e.g., smell a fragrance or odor associated with the tactile stimulation chemicals).

As described previously, a chemical formulation may be employed for detecting and displaying the result of UV exposure based on a wearable chemical sensor that absorbs UV radiation and changes molecular structure and resulting wavelength emission (e.g., an isomerization reaction). For example, one or more photochromatic chemicals may be used in a Stillbene isomerization reaction to produce color changes in a UV chemical sensor. For example, Spiropyrans (1',3'-Dihydro-1',3',3'-trimethyl-6-nitrospiro[2H-1-benzopyran-2,2'-(2H)-indole]) can be used to produce color changes through isomerization. The color changes with this particular molecule range from a green (a first color) to a purple (a second color). Additionally, the color changes are reversible, which allows a single UV chemical sensor to be used multiple times.

Figure 4:
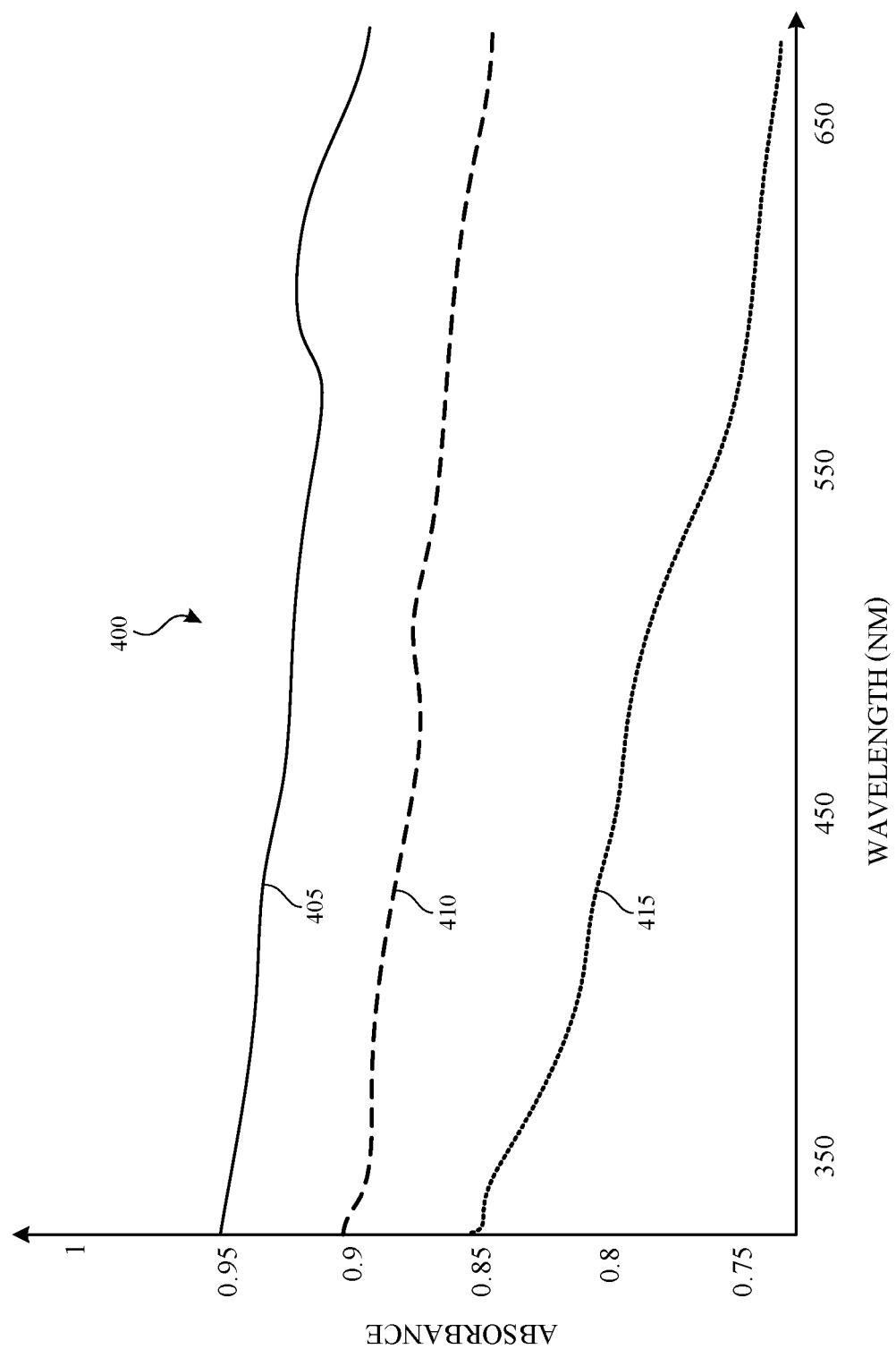
FIG. 4 is a graph depicting the color changing effects of exposing an ultraviolet chemical sensor to ultraviolet radiation over time.

FIG. 4 is a graph depicting the color changing effects of exposing a UV chemical sensor to UV radiation over time. The illustrated graph represents color changes in a UV chemical sensor that range from an orange color to a dark red color. Thus, the color changes over time transition from a first color to a second color in the FIG. 4 embodiment.

As illustrated, the plot 405 in graph 400 represents no UV exposure resulting in no color change of the UV chemical sensor. The UV chemical sensor continues to display the orange color. The plot 410 represents a medium UV exposure (e.g., 1-2 hours) resulting in a color change that transitions from an orange color to an orange-red hue. The plot 415 represents a long UV exposure (e.g., 3-4 hours) resulting in a color change that transitions from the orange-red hue to a dark red hue.

Ozone Chemical Sensor

Ozone is created by chemical reactions between oxides of nitrogen and volatile organic compounds in the presence of sunlight. Breathing ozone can trigger health problems, particularly for people who have lung diseases such as asthma. Ozone levels can vary based on geolocation, but regardless of the geolocation, the ozone levels may quickly fluctuate in cases of fire, stagnant air, and season.

In one embodiment, a wearable chemical sensor (e.g., an ozone chemical sensor) transitions from opaque to a visible color relative to ozone exposure. The ozone chemical sensor can include two separate chemical reactions. The first reaction involves the oxidation of potassium iodide (KI) by ozone to generate iodine ($I_2$). The second reaction involves the iodine reacting with the amylose found in starch. This $I_2$/amylose polymer complex changes the absorption and emission properties of the polymer, leading to a red coloration when exposure occurs. The concentration of the iodine present in the complex directly affects the intensity of the color observed, providing a measure of the original ozone concentration. Since the color change is irreversible, the ozone chemical sensor provides a good implementation for monitoring exposure over time to low levels of ozone present at typical ground levels.

The chemical reactions of the ozone chemical sensor are as follows:

$$2KI + O_3 + H_2O \rightarrow 2KOH + O_2 + I_2 \quad \text{Equation 4}$$

$$I_2 + \text{starch} \rightarrow \text{red/purple complex} \quad \text{Equation 5}$$

Figure 5:
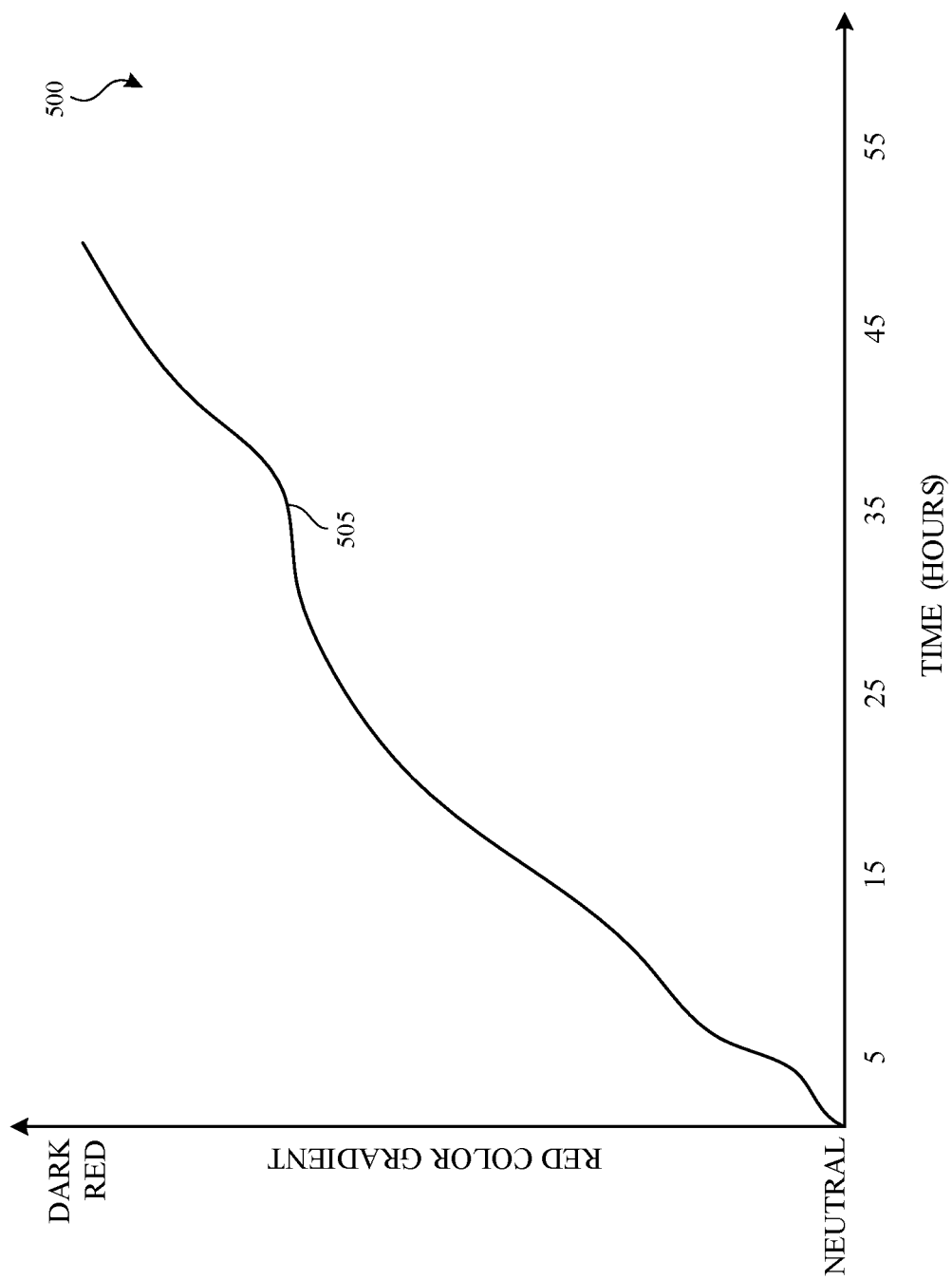
FIG. 5 is a graph illustrating the color changing effects of exposing an ozone chemical sensor to ozone over time.

FIG. 5 is a graph illustrating the color changing effects of exposing an ozone chemical sensor to ozone over time. As indicated, plot 505 in graph 500 represents that the ozone sensor is initially neutral in color (opaque when not exposed to ozone) and then gradually trends toward a darker red color as it is exposed to ozone over time. In other embodiments, an ozone chemical sensor may transition from opaque or a first color to a different second color (e.g., a color other than red).

Figure 6:
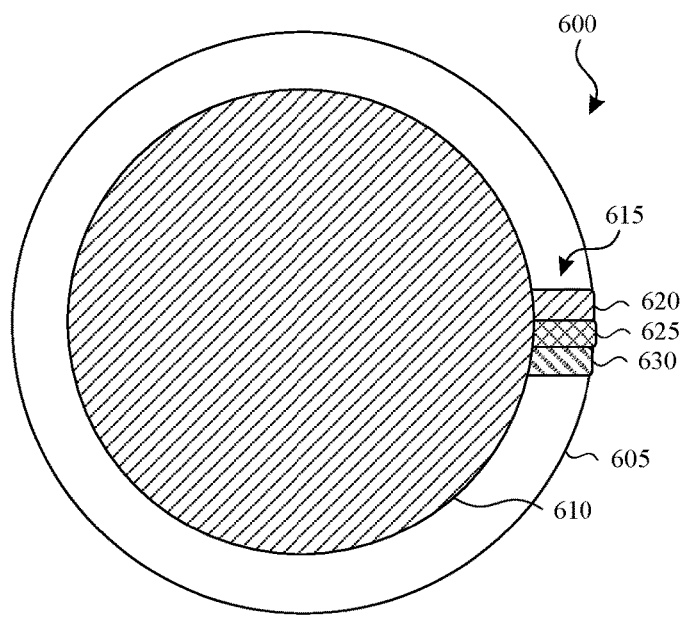
FIG. 6 depicts a first example of a wearable chemical sensor and an exposure indication card.

In some implementations, the color of a wearable chemical sensor may be compared to an exposure indicator card to determine an exposure level. FIG. 6 depicts a first example of a wearable chemical sensor and an exposure indication card. In the illustrated embodiment, the wearable chemical sensor 600 includes a patch 605 that a user attaches to his or her skin and a chemical sensing element 610. For example, the chemical sensing element 610 can be implemented as a UV radiation sensing element, an ozone sensing element, and/or a CO sensing element.

An exposure indicator card 615 is positioned along an edge of the wearable chemical sensor 600. The exposure indicator card 615 includes multiple color swatches with each swatch representing a different exposure level. In FIG. 6, the exposure indicator card 615 includes three swatches 620, 625, 630. Each swatch can include a legend (not shown) that informs the user of the exposure level to a pollutant. For example, a legend can provide an exposure level range (e.g., 0-50 ppm) or a word (e.g., normal, risk, danger). A user may compare a color of the wearable chemical sensor 600 with the swatches 620, 625, 630 to determine or confirm the exposure level to the pollutant.

Figure 7:
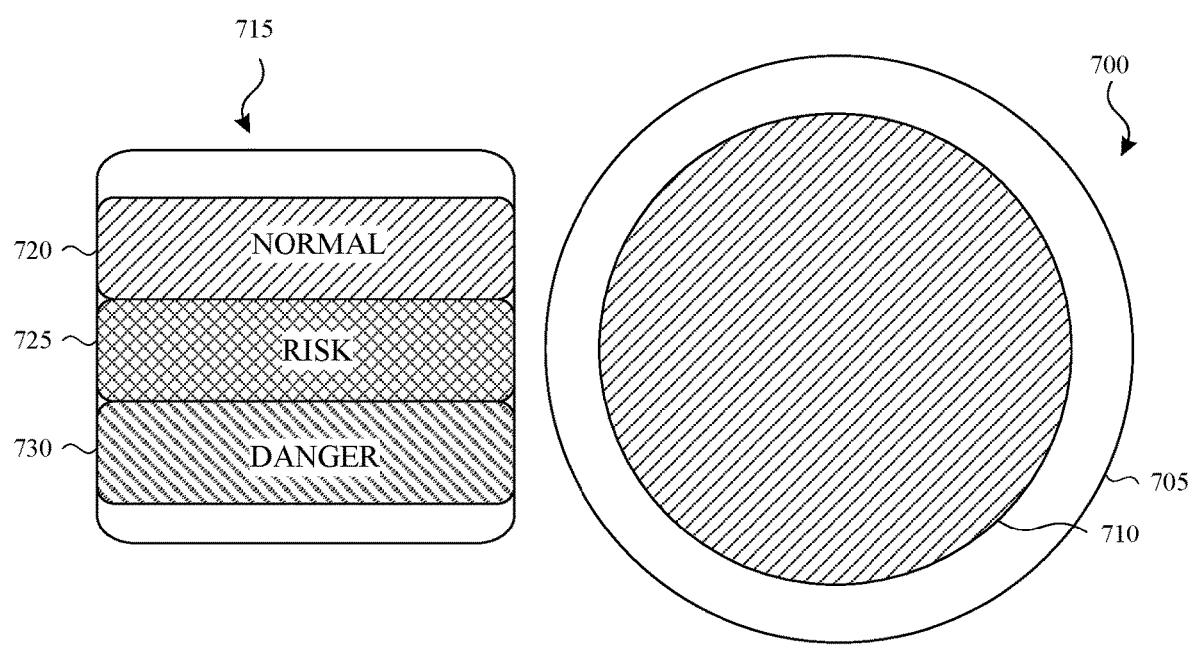
FIG. 7 illustrate a second example of a wearable chemical sensor and an exposure indication card.

FIG. 7 illustrate a second example of a wearable chemical sensor and an exposure indication card. Like FIG. 6, the wearable chemical sensor 700 includes a patch 705 that a user attaches to his or her skin and a chemical sensing element 710. The illustrated exposure indicator card 715 is distinct and separate from the wearable chemical sensor 700 and includes three swatches 720, 725, 730. Each swatch includes a word, with the swatch 720 representing a normal (e.g., non-hazardous) exposure level, the swatch 725 representing a risky exposure level, and the swatch 730 representing a dangerous exposure level. An exposure indicator card can include a different number of swatches in other embodiments.

FIGS. 8-12 and the associated descriptions provide a discussion of a variety of operating environments in which aspects of the disclosure may be practiced. However, the devices and systems illustrated and discussed with respect to FIGS. 8-12 are for purposes of example and illustration and are not limiting of a vast number of electronic device configurations that may be utilized for practicing aspects of the disclosure, as described herein.

Figure 8:
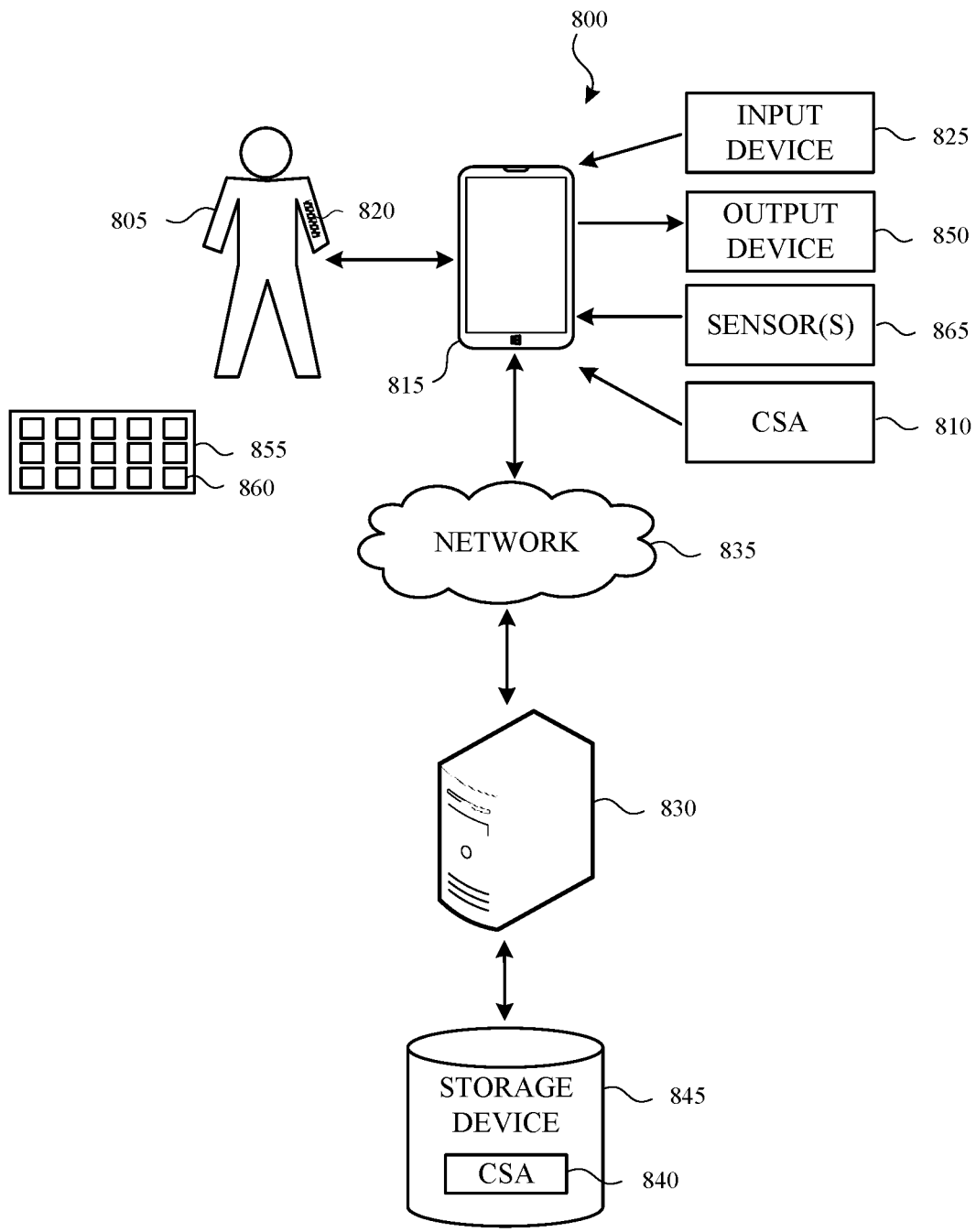
FIG. 8 depicts an example system that can implement a chemical sensor application suitable for use with a wearable chemical sensor.

FIG. 8 depicts an example system that can implement a chemical sensor application suitable for use with a wearable chemical sensor. The system 800 allows a user 805 to interact with a chemical sensor application (CSA) program 810 through a client-computing device 815. The user 805 may interact with the CSA program 810 separately from, or in conjunction with, a wearable chemical sensor 820 worn by the user 805. In one embodiment, the CSA program 810 is configured to provide information to the user, such as a recommendation for a chemical sensor and/or information on the wearable chemical sensor 820, an exposure level to a pollutant, and/or the exposure level indicated by the wearable chemical sensor 820.

The client-computing device 815 may include, or be connected to, an input device 825 that receives data associated with the wearable chemical sensor 820. Any suitable type of data can be submitted, such as an image. The input device 825 may be any suitable type of input device or devices configured to receive the data. In non-limiting example, the input device 825 may be an image capture device (e.g., a camera). The CSA program 810 can analyze one or more patterns and/or colors in the image and make a determination as to the type of wearable chemical sensor that has been applied to the user, the type of exposure that has occurred (e.g., ultraviolet radiation) and the extent of that exposure (e.g., the amount of ultraviolet radiation that the chemical has absorbed).

The client-computing device 815 is configured to access one or more server-computing devices (represented by server-computing device 830) through one or more networks (represented by network 835). The network 835 is illustrative of any suitable type of network, for example, an intranet and/or a distributed computing network (e.g., the Internet) over which the user 100 may communicate with other users and with other computing systems.

In addition, or as an alternative to the CSA program 810, a CSA program 840 can be stored on one or more storage devices (represented by storage device 845) and executed by the server-computing device 830. The user 805 can interact with the CSA program 840 through the client-computing device 815. The CSA program 840 provides, through the network 835, information regarding the wearable chemical sensor 820, the type of exposure that has occurred (e.g., UV radiation), an exposure level to a pollutant, the exposure level indicated by the wearable chemical sensor 820, and the like, to the client-computing device 815. Based on the received information, the client-computing device 815 can provide the information to any suitable output device 850 for presentation to the user 805. The output device 850 may be in, or connected to, the client-computing device 815. In non-limiting examples, the output device 850 is a display that displays the information and/or a speaker that "speaks" the information (e.g., using a text-to-speech application).

In some embodiments, the user 805 can use an exposure indicator card 855 to determine or confirm an exposure level indicated by the wearable chemical sensor 820. The exposure indicator card 855 includes multiple color swatches 860, with each swatch representing a different exposure level to a pollutant. The user 805 may compare a color of the wearable chemical sensor 820 with the swatches 860 on the exposure indicator card 855 to determine or confirm the exposure level to the pollutant.

In some instances, the client-computing device 815 may include, or be connected to one or more electronic sensors 865. Any suitable type of electronic sensor can be used. For example, one or more electronic chemical sensors can be included in, or connected to the client-computing device 815. An electronic chemical sensor may be used by the user 805 to confirm an exposure level indicated by the wearable chemical sensor 820. In some aspects, an electronic chemical sensor can be used by the CSA program 810 and/or 840.

Additionally or alternatively, one or more positional and/or environmental sensors may be included in, or connected to the client-computing device 815. Example positional and environmental sensors include, but are not limited to, an altimeter, a global positioning system, temperature sensor, humidity sensor, and/or an atmospheric pressure sensor. Data from one or more environmental sensors can be used by the CSA program 810 and/or 840 to provide information on an exposure level to a pollutant and/or an exposure level indicated by the wearable chemical sensor 820.

In one or more embodiments, the client-computing device 815 is a personal or handheld computing device. For example, the client-computing device 815 may be one of: a mobile telephone; a smart phone; a tablet; a phablet; a smart watch; a wearable computer; a personal computer; a desktop computer; a laptop computer; a gaming device/computer (e.g., Xbox); a television; and the like. This list of example client-computing devices is for example purposes only and should not be considered as limiting. Any suitable client-computing device may be utilized.

As should be appreciated, FIG. 8 is described for purposes of illustrating the present methods and systems and is not intended to limit the disclosure to a particular sequence of steps or a particular combination of hardware or software components.

Figure 9:
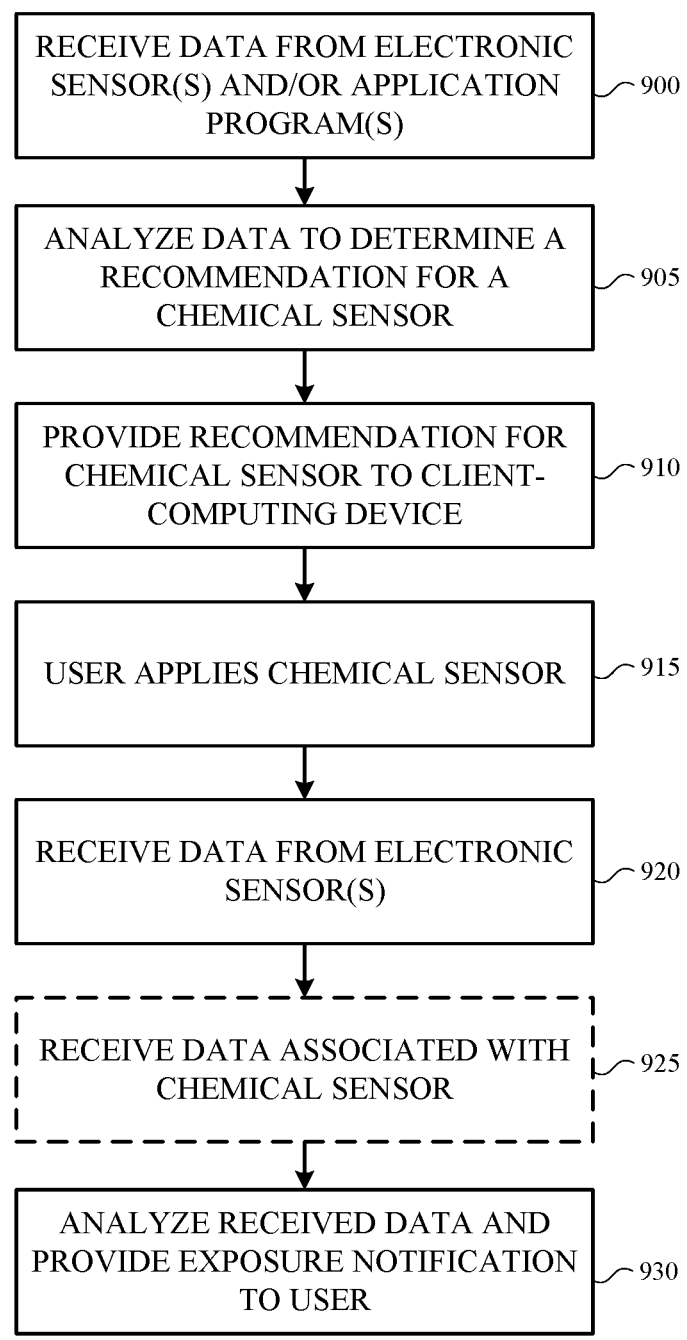
FIG. 9 is a flowchart illustrating an example method of operating a chemical sensor application program.

FIG. 9 is a flowchart illustrating an example method of operating a CSA program. Initially, data is received from one or more electronic sensors and/or one or more application programs at block 900. For example, one or more computing devices may receive user information such as location data (e.g., GPS coordinates of a mobile device associated with the user), images of a user (e.g., from a camera application), and/or application account information for a user (e.g., email, calendar, contacts, web browser history, etc.).

The received data is then analyzed to determine one or more recommendations for a wearable chemical sensor or sensors (block 905). The recommendation(s) is provided to a client-computing device for presentation to a user (block 910). For example, facial recognition and analysis software may make a determination regarding the skin tone of a user and recommendations for specific wearable chemical sensors tailored to persons in a range of that skin tone may be provided to the user. Additionally, machine learning algorithms or techniques (e.g., a neural network that learns from and produces predictions based on data) may be implemented to analyze user skin qualities and/or changes in skin qualities, such as elasticity, color, ultraviolet radiation damage, wrinkles, etc. The machine learning may be implemented over time to provide relevant personalized wearable chemical sensor recommendations based on the one or more skin qualities and/or the one or more changes in skin qualities and their development over time. According to another example, a determination may be made based on extracted calendar information (e.g., through one or more language model and/or machine learning) that a user is planning a trip to a tropical location and one or more chemical sensing compounds tailored to that environment may be provided to the user.

Next, as shown in block 915, a user applies a wearable chemical sensor to his or her skin. Data from one or more electronic sensors may then be received at block 920. For example, an image of the user (e.g., from an image sensor (e.g., a camera)), data from an electronic chemical sensor, and/or data from one or more other types of electronic sensors (e.g., global positioning system, altimeter, humidity, etc.) can be received at block 920. In some embodiments, data associated with the chemical sensor that is worn by the user can be received at block 925. For example, an image of the wearable chemical sensor may be received at block 925. Block 925 is optional and can be omitted in other embodiments.

The data received from the electronic sensor(s) in (or connected to) a client-computing device, and the data associated with the chemical sensor worn by the user (if available), is analyzed to determine an exposure level to a pollutant and an exposure notification is provided to a client-computing device for presentation to a user (block 930). The exposure notification can provide an exposure level to a pollutant and optionally information related to the exposure level. For example, the information related to the exposure level may indicate whether the exposure level is at a hazardous or a non-hazardous level.

Figure 10:
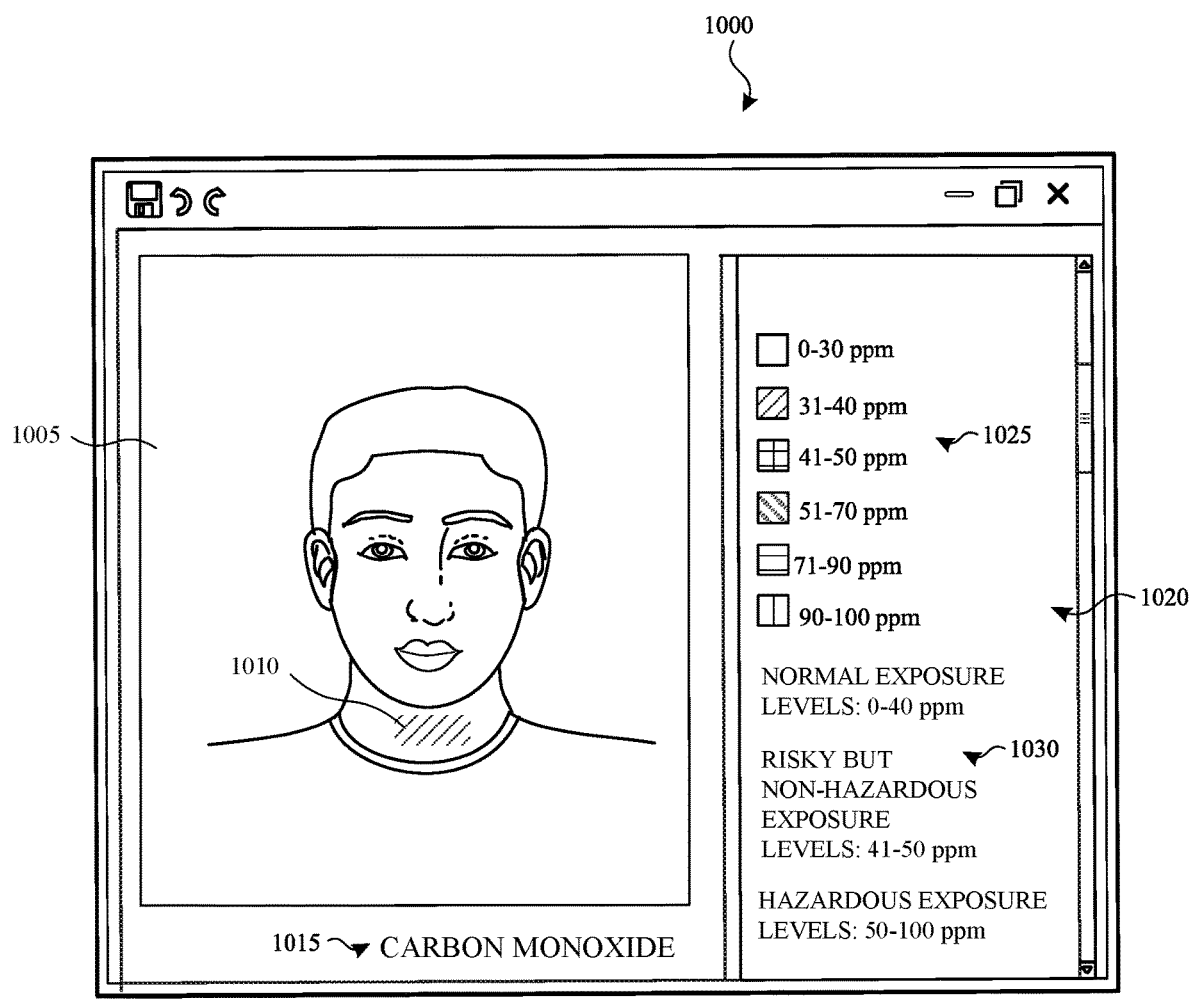
FIG. 10 depicts an example user interface suitable for use with a chemical sensor application program.

FIG. 10 illustrates an example user interface suitable for use with a CSA program. The representative user interface 1000 includes a photo or image 1005 of a user wearing a chemical sensor 1010. The user interface 1000 may also identify a pollutant type 1015 (e.g., CO) and/or include an information section 1020. The information section 1020 can include multiple swatches 1025 that each correlate a color of the wearable chemical sensor 1010 with an exposure level of the pollutant type 1015. Additionally, the information section 1020 may also include a listing 1030 of a safety level associated with the pollutant type 1015. For example, in the illustrated embodiment, three safety levels are listed along with the exposure levels associated with the safety levels.

Figure 11:
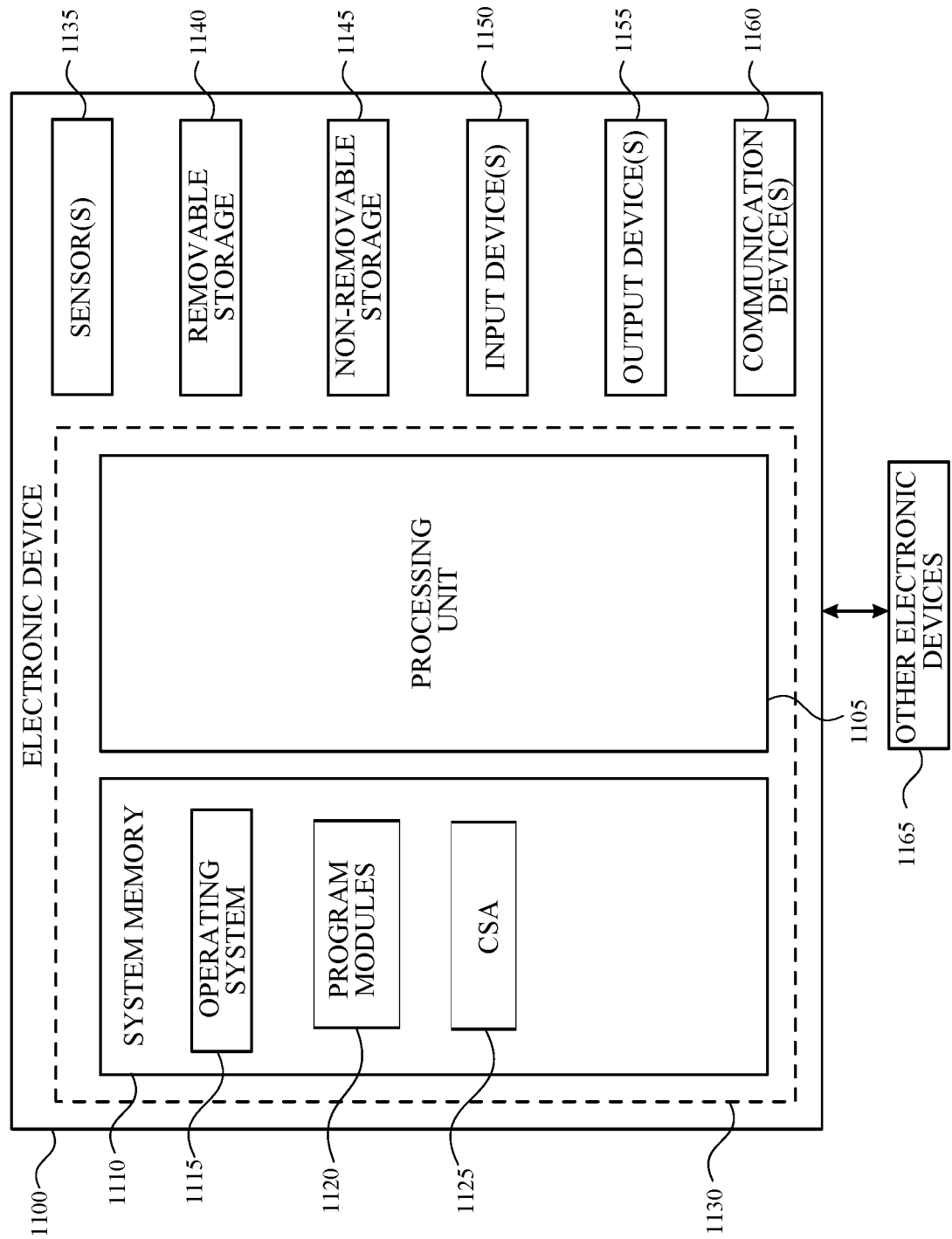
FIG. 11 is a block diagram illustrating example physical components of an electronic device with which aspects of the disclosure may be practiced.

FIG. 11 is a block diagram illustrating physical components (e.g., hardware) of an electronic device 1100 with which aspects of the disclosure may be practiced. The components described below may be suitable for the computing devices described above, including the client-computing device 815 and/or the server-computing device 830 in FIG. 8.

In a basic configuration, the electronic device 1100 may include at least one processing unit 1105 and a system memory 1110. Depending on the configuration and type of the electronic device, the system memory 1110 may comprise, but is not limited to, volatile storage (e.g., random access memory), non-volatile storage (e.g., read-only memory), flash memory, or any combination of such memories. The system memory 1110 may include a number of program modules and data files, such as an operating system 1115, one or more program modules 1120 suitable for parsing received input, determining subject matter of received input, determining actions associated with the input and so on, and a chemical sensor application (CSA) program 1125. While executing on the processing unit 1105, the CSA program 1125 may perform and/or cause to be performed processes including, but not limited to, the aspects as described herein.

The operating system 1115, for example, may be suitable for controlling the operation of the electronic device 1100. Furthermore, embodiments of the disclosure may be practiced in conjunction with a graphics library, other operating systems, or any other application program and is not limited to any particular application or system. This basic configuration is illustrated in FIG. 11 by those components within a dashed line 1130.

The electronic device 1100 may have additional features or functionality. For example, the electronic device 1100 can also include one or more electronic sensors 1135. Any suitable type of electronic sensor may be used. In one embodiment, the electronic sensor(s) 1135 can be a carbon monoxide sensor, an ozone sensor, a UV sensor, an altimeter, a global positioning system, a temperature sensor, a humidity sensor, and the like.

The electronic device 1100 may also include additional data storage devices (removable and/or non-removable) such as, for example, magnetic disks, optical disks, or tape. Such additional storage is illustrated in FIG. 11 by a removable storage device 1140 and a non-removable storage device 1145.

The electronic device 1100 may also have one or more input device(s) 1150 such as a keyboard, a trackpad, a mouse, a pen, a sound or voice input device, a touch, force and/or swipe input device, etc. The output device(s) 1155 such as a display, speakers, a printer, etc. may also be included. The aforementioned devices are examples and others may be used. The electronic device 1100 may include one or more communication devices 1160 allowing communications with other electronic devices 1165. In some instances, the communications with other electronic devices can permit the CSA program 1125 to interface with an application program that is executing on at least one of the other electronic devices 1165. Examples of suitable communication devices 1160 include, but are not limited to, radio frequency (RF) transmitter, receiver, and/or transceiver circuitry, a universal serial bus (USB), and/or parallel and/or serial ports.

The term computer-readable media or storage device as used herein may include computer storage media or devices. Computer storage media may include volatile and nonvolatile, removable and non-removable media implemented in any method or technology for storage of information, such as computer readable instructions, data structures, or program modules.

The system memory 1110, the removable storage device 1140, and the non-removable storage device 1145 are all computer storage media examples (e.g., memory storage or storage devices). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the electronic device 1100. Any such computer storage media may be part of the electronic device 1100. Computer storage media does not solely include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 11 may be integrated onto a single integrated circuit. Such an SOC device may include one or more processing units, graphics units, communications units, system virtualization units and various application functionality all of which are integrated (or "burned") onto the chip substrate as a single integrated circuit.

When operating via an SOC, the functionality described herein may be operated via application-specific logic integrated with other components of the electronic device 1100 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Figure 12A:
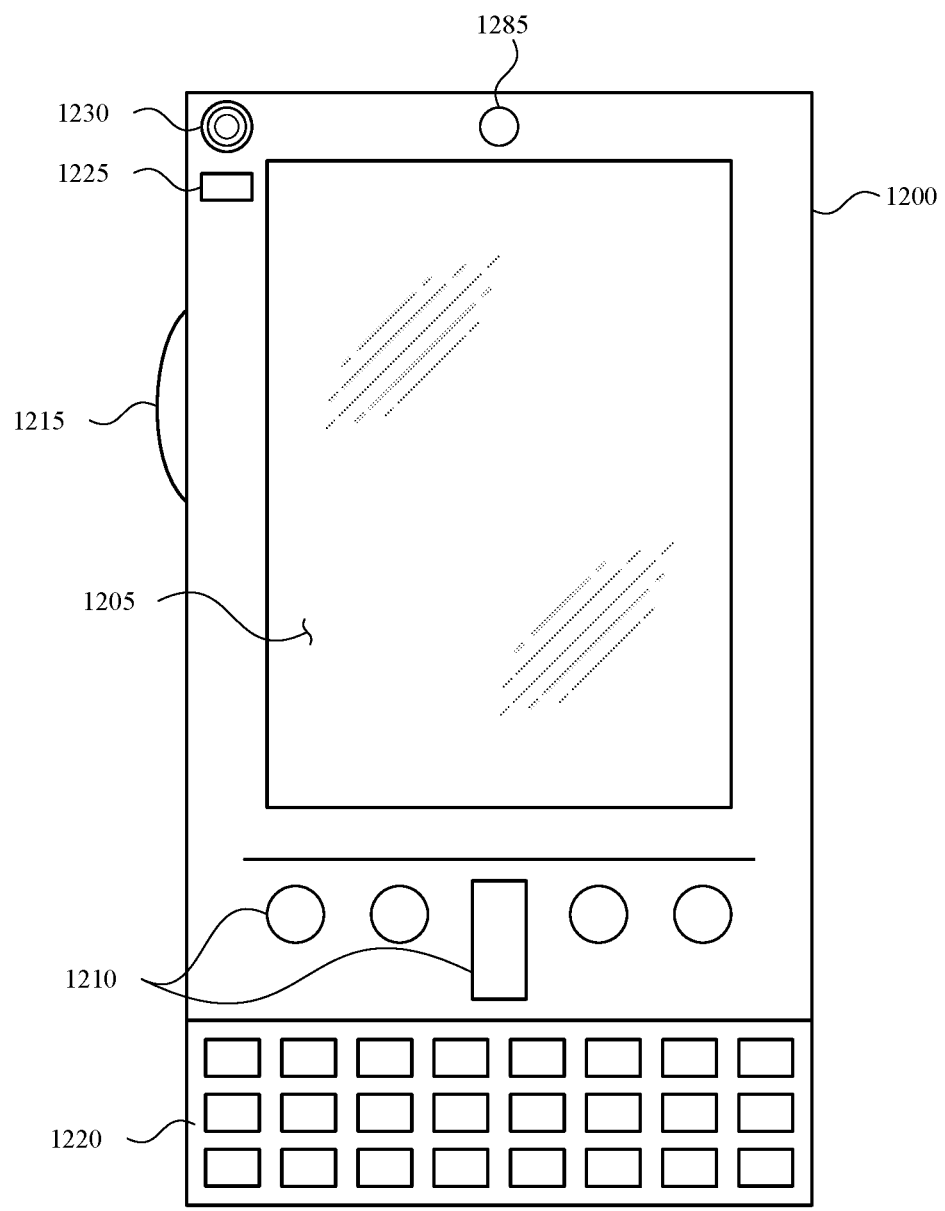
FIGS. 12A-12B are simplified block diagrams depicting a mobile computing device with which aspects of the present disclosure may be practiced.
Figure 12B:
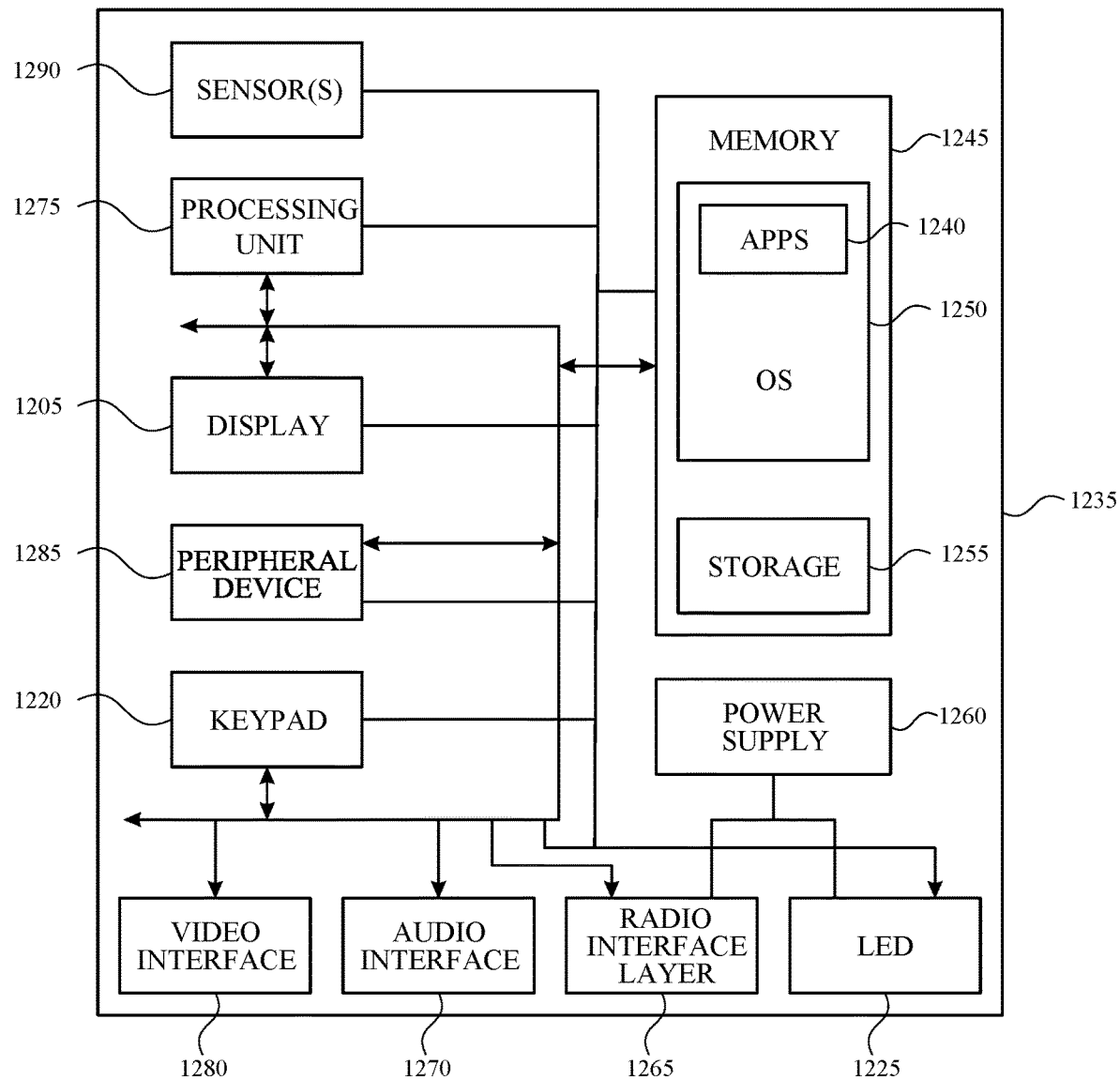

FIGS. 12A-12B illustrate a mobile electronic device 1200, for example, a mobile telephone, a smart phone, wearable computer (such as a smart watch), a tablet computer, a laptop computer, and the like, with which embodiments of the disclosure may be practiced. With reference to FIG. 12A, one aspect of a mobile electronic device 1200 for implementing the aspects is illustrated. The components described below may be suitable for the computing devices described above, including the client-computing device 815 in FIG. 8.

In a basic configuration, the mobile electronic device 1200 is a handheld computer having both input elements and output elements. The mobile electronic device 1200 typically includes a display 1205 and one or more input buttons 1210 that allow the user to enter information into the mobile electronic device 1200. The display 1205 of the mobile electronic device 1200 may also function as an input device (e.g., a display that accepts touch and/or force input).

If included, an optional side input element 1215 allows further user input. The side input element 1215 may be a rotary switch, a button, or any other type of manual input element. In alternative aspects, mobile electronic device 1200 may incorporate more or less input elements. For example, the display 1205 may not be a touch screen in some embodiments. In yet another alternative embodiment, the mobile electronic device 1200 is a portable phone system, such as a cellular phone. The mobile electronic device 1200 may also include an optional keypad 1220. Optional keypad 1220 may be a physical keypad or a "soft" keypad generated on the touch screen display.

In various embodiments, the output elements include the display 1205 for showing a graphical user interface (GUI) and a set of available templates, a visual indicator 1225 (e.g., a light emitting diode), and/or an audio transducer 1230 (e.g., a speaker). In some aspects, the mobile electronic device 1200 incorporates a vibration transducer for providing the user with tactile feedback. In yet another aspect, the mobile electronic device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 12B is a block diagram illustrating the architecture of one aspect of a mobile electronic device 1200. That is, the mobile electronic device 1200 can incorporate a system (e.g., an architecture) 1235 to implement some aspects. In one embodiment, the system 1235 is implemented as a "smart phone" capable of running one or more applications (e.g., browser, e-mail, calendaring, contact managers, messaging clients, games, media clients/players, content selection and sharing applications and so on). In some aspects, the system 1235 is integrated as an electronic device, such as an integrated personal digital assistant (PDA) and wireless phone.

One or more application programs 1240 may be loaded into the memory 1245 and run on or in association with the operating system 1250. Examples of the application programs include a CSA program, phone dialer programs, e-mail programs, personal information management (PIM) programs, word processing programs, spreadsheet programs, Internet browser programs, messaging programs, and so forth.

The system 1235 also includes a non-volatile storage area 1255 within the memory 1245. The non-volatile storage area 1255 may be used to store persistent information that should not be lost if the system 1235 is powered down.

The application programs 1240 may use and store information in the non-volatile storage area 1255, such as electronic communications, calendars, images, audio, video, documents, and the like. A synchronization application (not shown) also resides on the system 1235 and is programmed to interact with a corresponding synchronization application resident on a host computer to keep the information stored in the non-volatile storage area 1255 synchronized with corresponding information stored at the host computer.

The system 1235 has a power supply 1260, which may be implemented as one or more batteries. The power supply 1260 may further include an external power source, such as an AC adapter or a powered docking cradle that supplements or recharges the batteries.

The system 1235 may also include a radio interface layer 1265 that performs the function of transmitting and receiving radio frequency communications. The radio interface layer 1265 facilitates wireless connectivity between the system 1235 and the "outside world," via a communications carrier or service provider. Transmissions to and from the radio interface layer 1265 are conducted under control of the operating system 1250. In other words, communications received by the radio interface layer 1265 may be disseminated to the application programs 1240 via the operating system 1250, and vice versa.

The visual indicator 1225 may be used to provide visual notifications, and/or an audio interface 1270 may be used for producing audible notifications via an audio transducer (e.g., audio transducer 1230 illustrated in FIG. 12A). In the illustrated embodiment, the visual indicator 1225 is a light emitting diode (LED) and the audio transducer 1230 may be a speaker. These devices may be directly coupled to the power supply 1260 so that when activated, they remain on for a duration dictated by the notification mechanism even though the processing unit 1275 and other components might shut down for conserving battery power. The LED may be programmed to remain on indefinitely until the user takes action to indicate the powered-on status of the device.

The audio interface 1270 is used to provide audible signals to and receive audible signals from the user (e.g., voice input such as described above). For example, in addition to being coupled to the audio transducer 1230, the audio interface 1270 may also be coupled to a microphone to receive audible input, such as to facilitate a telephone conversation. In accordance with embodiments of the present disclosure, the microphone may also serve as an audio sensor to facilitate control of notifications, as will be described below.

The system 1235 may further include a video interface 1280 that enables an operation of peripheral device 1285 (e.g., on-board camera) to record still images, video stream, and the like.

A mobile electronic device 1200 implementing the system 1235 may have additional features or functionality. For example, the mobile electronic device 1200 can also include additional data storage devices (removable and/or non-removable) such as, magnetic disks, optical disks, or tape. Such additional storage is illustrated in FIG. 12B by the non-volatile storage area 1255. Additionally or alternatively, the mobile electronic device 1200 may also include one or more electronic sensors 1290. Any suitable type of sensor may be used. In one embodiment, the electronic sensor(s) 1290 can be a carbon monoxide sensor, an ozone sensor, a UV sensor, an altimeter, a global positioning system, a temperature sensor, a humidity sensor, and the like.

Figure 13:
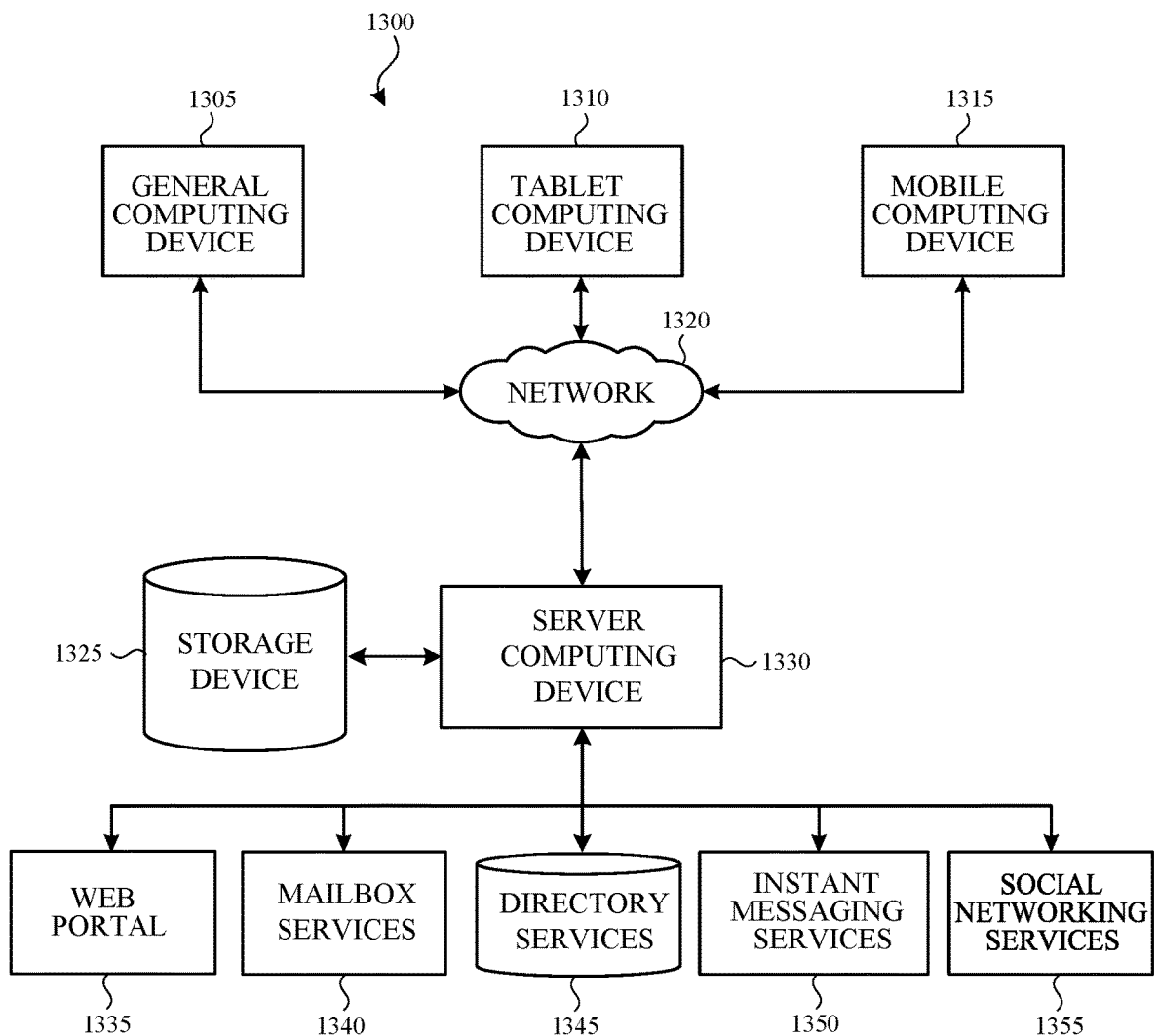
FIG. 13 is a block diagram illustrating a distributed computing system in which aspects of the present disclosure may be practiced.

FIG. 13 is a block diagram illustrating a distributed system in which aspects of the disclosure may be practiced. The system 1300 allows a user to interface or interact with a CSA program and/or other application programs through a general computing device 1305 (e.g., a desktop computer), a tablet computing device 1310, and/or a mobile computing device 1315. The general computing device 1305, the tablet computing device 1310, and the mobile computing device 1315 can each include the components shown in the electronic device of FIG. 11 and/or FIGS. 12A-12B.

The general computing device 1305, the tablet computing device 1310, and the mobile computing device 1315 can each store and/or execute a CSA program and other application programs (not shown in FIG. 13). Additionally or alternatively, the general computing device 1305, the tablet computing device 1310, and the mobile computing device 1315 are each configured to access one or more networks (represented by network 1320) to interact with a CSA program and/or one or more other application programs stored on one or more storage devices (represented by storage device 1325) and executed on one or more server-computing devices (represented by server-computing device 1330).

In some aspects, the server-computing device 1330 can access, transmit, and/or receive various types of data from other sources, such as a web portal 1335, mailbox services 1340, a directory service 1345, instant messaging services 1350, and/or social networking services 1355. The web portal 1335, the mailbox services 1340, the directory service 1345, the instant messaging services 1350, and/or the social networking services 1355 can interface with a CSA program. In some instances, these sources may provide robust reporting, analytics, data compilation and/or storage service, etc., whereas other services may provide search engines or other access to data and information, images, videos, document processing and the like.

As should be appreciated, FIGS. 8-12 are described for purposes of illustrating the present methods and systems and is not intended to limit the disclosure to a particular sequence of steps or a particular combination of hardware or software components.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A wearable chemical sensor, comprising:
   a first layer for producing one or more first chemical responses to a pollutant; and
   a second layer underlying the first layer for producing one or more second chemical responses in response to the one or more first chemical responses in the first layer, wherein the one or more second chemical responses produce a range of color changes over time based on a length of exposure to the pollutant or a concentration of the pollutant, and wherein the range of color changes represent different exposure levels to the pollutant.

2. The wearable chemical sensor of claim 1, wherein at least one of the one or more second chemical responses comprises a conversion reaction that converts a first chemical to a different second chemical.

3. The wearable chemical sensor of claim 1, wherein at least one of the one or more second chemical responses comprises an isomerization reaction.

4. The wearable chemical sensor of claim 1, wherein the pollutant comprises ultraviolet light.

5. The wearable chemical sensor of claim 1, wherein the pollutant comprises ozone.

6. The wearable chemical sensor of claim 1, wherein the pollutant comprises carbon monoxide.

7. The wearable chemical sensor of claim 1, wherein an exposure indicator card is provided with the wearable chemical sensor.

8. The wearable chemical sensor of claim 1, wherein the exposure indicator card is attached to the wearable chemical sensor.

9. The wearable chemical sensor of claim 1, wherein the wearable chemical sensor comprises one of a patch, a powder, or a cream.

10. A method, comprising:
receiving data from one or more electronic sensors in or connected to a client-computing device;
analyzing the received data to determine a recommendation for a wearable chemical sensor that is configured to produce a range of color changes over time through one or more chemical reactions in a first layer and one or more chemical reactions in a second layer of the wearable chemical sensor that are based on a length of exposure to the pollutant or a concentration of the pollutant, wherein the one or more chemical reactions in the second layer is produced in response to the one or more chemical reactions in the first layer, and wherein the analysis comprises an analysis using a machine learning process that determines the recommendation based on one or more skin qualities associated with a user; and
causing a presentation of the recommendation on a client-computing device.

11. The method of claim 10, further comprising receiving data from one or more applications prior to analyzing the received data.

12. The method of claim 10, wherein the client-computing device performs the operation of analyzing the received data to determine the recommendation for the wearable chemical sensor.

13. The method of claim 10, wherein a server-computing device performs the operation of analyzing the received data to determine the recommendation for the wearable chemical sensor.

14. The method of claim 10, wherein the one or more electronic sensors comprise at least one of an electronic chemical sensor, a global positioning system, an altimeter, or an image sensor in a camera.

15. A method of operating a wearable chemical sensor, the method comprising:
detecting a pollutant;
producing a range of color changes over time through one or more chemical responses in a first layer and one or more chemical responses in a second layer of the wearable chemical sensor that is based on a length of exposure to the pollutant, wherein the range of color changes represents a plurality of exposure levels to the pollutant, and wherein the one or more chemical responses in the second layer is produced in response to the one or more chemical responses in the first layer; and
releasing one or more chemicals when an exposure level of the plurality of exposure levels reaches a given exposure level.

16. The method of claim 15, wherein the operation of releasing the one or more chemicals when the exposure level reaches the given exposure level comprises releasing the one or more chemicals to produce a tactile stimulation.

17. The method of claim 16, wherein the given exposure level comprises an exposure level that approaches or is a harmful exposure level.

18. The method of claim 15, wherein the operation of releasing the one or more chemicals when the exposure level reaches the given exposure level comprises releasing the one or more chemicals to provide a protectant.

19. The method of claim 15, wherein the wearable chemical sensor comprises a powder.

20. The method of claim 15, wherein the pollutant comprises one of ozone or carbon monoxide.

* * * * *